April 22, 1941.   J. W. ANDERSON   2,238,877
REARVIEW MIRROR
Filed Dec. 18, 1937
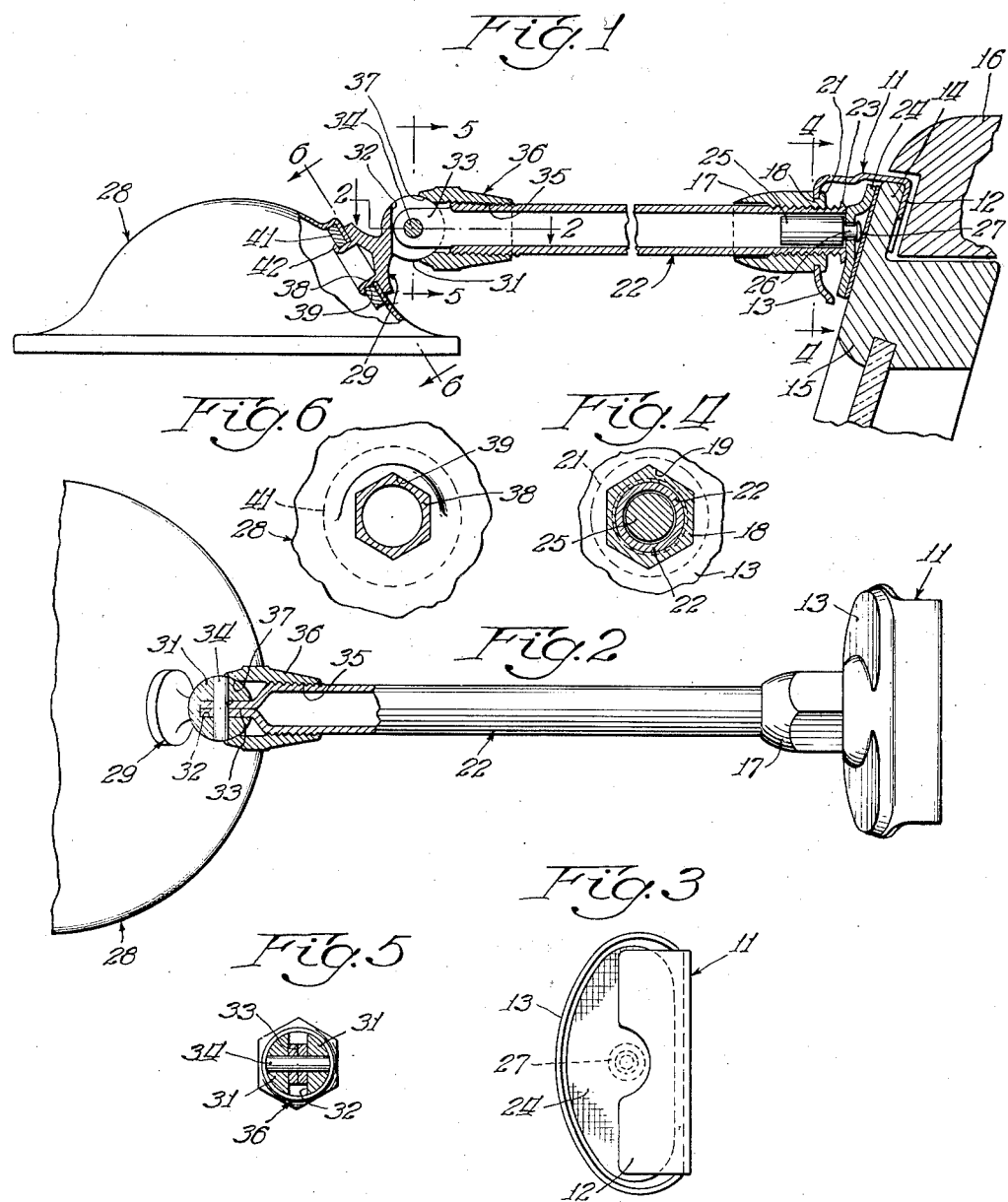
Inventor:
John W. Anderson
By: Hill & Hill
Attys.

Patented Apr. 22, 1941

2,238,877

UNITED STATES PATENT OFFICE 2,238,877

REARVIEW MIRROR

John W. Anderson, Gary, Ind., assignor to Productive Inventions, Inc., Gary, Ind., a corporation of Indiana Application December 18, 1937, Serial No. 180,601

4 Claims. (Cl. 248—226)

This invention relates to supporting devices, and particularly to a novel construction and arrangement for supporting rearview mirrors on motor vehicle bodies or the like.

Heretofore, it has been customary to attach to motor vehicles, rearview mirrors either as original equipment or as an accessory thereto by means of conventional tools or by means of special tools. It has been generally customary to provide such mirrors with securing means which are normally accessible externally of the vehicle and in such instances when conventional tools are employed, the mirror is readily susceptible of theft. In other instances it has been found that where special tools are necessary, frequently such special tools are not readily available for the convenient installation of a mirror upon a motor vehicle.

In accordance with my invention, I have devised a rearview mirror which is adapted to be securely mounted on a vehicle without the use of tools of any sort and this is accomplished by providing a mirror frame which may be utilized as a lever or hand grip for operating the clamp means in such manner as to grip the supporting portion of the vehicle thereby to rigidly secure the mirror to the vehicle. Such an arrangement has the additional advantage that it is not readily apparent to everyone as to the manner in which such a mirror is secured to the vehicle thereby rendering it less susceptible to theft by one not familiar with the manner of attachment.

One object of the present invention is to provide a novel construction and arrangement for mounting rear view mirrors, preferably, on the outer side of motor vehicle bodies, such, for example, as doors, or the like.

Another object of my invention is to provide an improved rearview mirror adapted to be secured to a vehicle wherein the mirror frame may serve as a lever or hand grip in actuating the clamping means to secure the mirror to the vehicle.

Another object of the invention is to provide a device of the character described which may be readily and conveniently mounted on a vehicle body in a minimum of time, and without the use of tools.

Another object of the invention is to provide a device of novel construction, which may be rigidly secured in place on a vehicle in a manner to eliminate vibration of the device thereon, and wherein a portion of the device serves to lock the securing means in operative position.

Another object of the invention is to provide a device of novel construction, which may be secured to a vehicle door in a manner to prevent removal of the device from the door and vehicle when the door is closed.

Another object of the invention is to provide a novel and efficient construction for positioning the mirror and frame therefor in various positions of angular adjustment with respect to the supporting arm, and for maintaining the connector between the frame and arm in operative position.

A further object of the invention is to provide a device, which is economical to produce and assemble, easy to install, and which may be rigidly secured in operative position.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a plan sectional view of a mirror-supporting device and attaching means therefore embodying features of the present invention;

Fig. 2 is an elevational view partly in section, taken from the rear side of the mirror, the sectioned portion thereof being taken substantially as indicated by the line 2—2 of Fig. 1;

Fig. 3 is an end view of the structure illustrated in Fig. 1 as viewed from the bracket end thereof;

Fig. 4 is an enlarged transverse sectional elevational view taken substantially, as indicated by the line 4—4 of Fig. 1;

Fig. 5 is a transverse sectional view taken as indicated by the line 5—5 of Fig. 1; and Fig. 6 is an enlarged sectional view taken substantially as indicated by the line 6—6 of Fig. 1.

The illustrative embodiment of the present invention shown in the drawing comprises a bracket member indicated, as a whole, by the numeral 11 and comprising an elongated structure of substantially U-shaped cross-section having inner and outer leg portions 12 and 13, respectively, the leg portion 12, as illustrated in Fig. 1, being adapted to be positioned at one side of a portion of a vehicle structure, and shown, in the present instance, as positioned on the inner side of an edge portion 14 of a door 15 associated with a motor vehicle or the like, the leg portion 12 being positioned between the edge portion 14 of the door and a corner post or other body portion 16 of a motor vehicle. It will be understood, however, that the bracket may be attached to other portions of a vehicle as, for example, the window or ventilating wings carried by the door of the vehicle.

Mounted in the outer leg portion 13 of the bracket 11 is an internally screw-threaded sleeve 17 shown, in the present instance, as provided with a multi-sided or hexagonal shank portion 18 adapted to be positioned in and to extend through a correspondingly shaped aperture 19 formed in the leg portion 13 to prevent turning of the sleeve with respect thereto, the inner end portion of the shank 18 being headed or spread outwardly to provide a flange as indicated at 21 for securing the sleeve in fixed position with respect to the bracket.

Rotatably mounted in the sleeve 17 is a supporting arm shown, in the present instance, as of hollow tubular form and indicated, as a whole, by the numeral 22 having external screw threads formed thereon adapted to cooperate with the internally threaded portion of the sleeve 17, the arm 22 being adapted to extend through the sleeve and leg portion 13 of the bracket and provided on its inner end with a laterally extending flange 23 to stop or prevent removal of the arm from the sleeve when moved in an outwardly direction by relative rotation of the arm and sleeve.

Positioned between the leg portions 12 and 13 of the bracket 11 is a pressure plate 24 adapted to engage the outer side of the edge portion 14 of the door 15 for clamping the bracket 11 thereto, the pressure plate 24 being supported on the inner end portion of the arm 22 by means of a stud 25 shown, in the present instance, as loosely mounted within the hollow end portion of the arm 22 and having a trunnion 26 adapted to be positioned in an aperture formed in the pressure plate 24, and provided with a head 27 for securing the pressure plate against accidental displacement with respect thereto, the plate being shown, in the present instance, as loosely mounted on the trunnion 26 for providing ample flexibility to permit the plate 24 to readily adjust itself for proper engagement with the outer side of the edge portion 14 of the vehicle door for securing the bracket and arm thereto.

It will be observed from the foregoing description that by relative rotation of the sleeve 17 and arm 22, or, as in the present instance, by rotating the arm within the sleeve 17, the arm, by reason of the threaded portion thereof, will be moved longitudinally of the sleeve in a manner to force the pressure plate 24 against the edge portion 14 of the door frame and to produce a binding action thereon between the plate 24 and leg portion 12 of the bracket 11 for securing the bracket rigidly thereto, it being intended that the material of the bracket 11 shall possess sufficient resiliency to produce a binding or locking action between the threads of the sleeve 17 and arm 22 when sufficient force is exerted to separate or spread slightly the leg portions 12 and 13 of the bracket 11, thereby providing a substantially rigid connection between the bracket and door frame in a manner to eliminate vibration of the arm with respect to the vehicle door and body, and to secure the arm 22 against accidental rotation with respect to the sleeve 17.

Mounted adjacent the opposite end portion of the arm 22 is a mirror-supporting frame 28 having a hinge member indicated, as a whole, by the numeral 29 mounted thereon and extending laterally therefrom, the hinge member being shown, in the present instance, as provided with a spherical portion or head 31 having a recess 32 formed therein adapted to receive the adjacent flattened end portion 33 of the arm 22, and to be secured thereto by means of a pivot pin 34 extending transversely to the center line of the supporting arm 22 in a manner to permit angular movement of the hinge member and mirror-supporting frame thereon into various positions of adjustment with respect to the supporting arm.

For securing the hinge member and mirror-supporting frame in various positions of angular adjustment, the supporting arm 22 is provided with a screw-threaded portion, indicated at 35, adapted to cooperate with an internally screw-threaded locking member 36 having an inner annular portion 37 adapted to engage the spherical head 31 of the hinge member 29 when the locking member 36 is rotated on the threaded portion 35 to move the locking member toward the hinge member 29, the member 36 extending outwardly in a manner to overlie the end portions of the pivot pin 34 for securing the pin against displacement with respect to said head and the adjacent end portion of the arm 22, as clearly illustrated in Fig. 2.

For securing the hinge member 29 rigidly and against rotation with respect to the mirror-supporting frame 28, the hinge member 29 may be provided with a multi-sided or hexagonal shank portion 38 adapted to extend through a correspondingly shaped aperture 39 formed in the mirror-supporting frame 28 and a washer 41 positioned on the interior of the frame, the shank portion 38 being provided with a laterally extending flange or head portion 42 for securing the hinge member 29, mirror-supporting frame 28 and washer 41 securely and rigidly with respect to each other.

It will be observed from the foregoing description that the hinge member 29 and the mirror-supporting frame 28 thereon may be conveniently and readily positioned at various angles of adjustment with respect to the arm 22 and secured in such positions by rotation of the screw-threaded locking member 36.

It will be observed also that by reason of the character of the single or one-way pivotal connection between the hinge member 29 and supporting arm 22, the mirror-supporting frame 28 may be used as a gripping member or lever to facilitate rotation of the supporting arm 22 relatively to the sleeve 17 for urging the pressure plate 24 against the outer side of the edge portion 14 of the door frame with sufficient force to provide a rigid application of the bracket 11 to the edge portion 14 of the door.

It will be observed from the foregoing description that the present invention provides a novel construction and arrangement whereby the mirror-supporting frame 28 and supporting arm 22 therefor may be readily and conveniently mounted on a vehicle in a minimum of time and without the use of tools, also that the bracket 11 may be rigidly secured in place, and wherein a portion of the device serves to lock the securing means in operative position.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. A rearview mirror construction for motor vehicles and adapted to be mounted on the outside of the body thereof, comprising a mirror, a mirror-supporting arm, and an anti-theft mounting for said arm, said mounting comprising a pressure member adapted to be positioned against the outer surface of the thin marginal extension of a door of the vehicle and adjacent the edge of said extension, a channel-shaped clamping bracket member of substantial length and comprising spaced and opposed side-wall portions of substantial area and a connecting or bridge portion therebetween, said clamping bracket member being adapted to embrace the free side edge of said thin marginal extension of the door with one of its side-wall portions engaging the inner surface of said marginal extension, with the other of said side-wall portions extending over the outer side of said marginal extension and spaced therefrom and extending over said pressure member, and with said bridge portion extending between the edge of said marginal extension of the door and a portion of the door-jamb positioned laterally of and directly opposed to said edge, the side-wall portion engaging the inner face of the marginal extension and said bridge portion respectively having such thickness, not exceeding the spaces between the door-jamb and said inner surface of said marginal extension and between said door-jamb and said edge, as not to interfere with the opening and closing of the door, said bridge portion being in close engagement with said edge of said marginal extension of the door for a substantial distance so as to prevent relative rotation of the bracket member upon the door surfaces engaged thereby, the outer side-wall of said channel-shaped member having an opening through which said supporting arm extends into engagement with said pressure member, and means connecting said arm and said last-mentioned side-wall portion whereby relative rotation of said arm and means acts to force said pressure member tightly against the outer face of the door and thus draw the inner side-wall member tightly against the inner surface of the door, so as to mount said parts securely on said door in such relation to the jamb thereof that the device as a whole cannot be dismounted when the door is closed.

2. A rearview mirror construction for motor vehicles and adapted to be mounted on the outside of the body thereof, comprising a mirror-supporting arm, and an anti-theft mounting for said arm, said mounting comprising a channel-shaped clamping bracket member of substantial length and having spaced and opposed side-wall portions of substantial area and a connecting or bridge portion therebetween, said clamping bracket member being adapted to embrace the free side edge of a door of the vehicle with one of its side-wall portions engaging the inner surface of said door, with the other of said side-wall portions extending over and in spaced relation to the outer surface of said door, and with said bridge portion extending between said edge of the door and a portion of the door-jamb positioned laterally of and directly opposed to said edge of the door, said bridge portion having such thickness, not exceeding the space between the door-jamb and said edge of the door, as not to interfere with opening and closing of the door, said bridge portion being in close engagement with said edge of said door for a substantial distance so as to prevent relative rotation of the bracket member upon the door surfaces engaged thereby, the outer side wall of said channel-shaped member having a threaded portion through which said supporting arm extends in threaded relation toward the outer surface of said door whereby rotation of said arm relatively to said outer side wall causes the end of said arm to apply pressure against the outer face of said door and the inner side-wall member is drawn tightly against the inner surface of the door, so as to mount said parts securely on said door in such relation to the jamb thereof that the device as a whole cannot be dismounted when the door is closed.

3. In an anti-theft mounting for motor-vehicle accessories, a substantially U-shaped clamp member having spaced and opposed side-walls and a connecting or bridge portion therebetween, said clamp member being adapted to embrace the edge of a door of the vehicle with a first of said side-walls of said clamp member engaging the inner face of the door, with a second of said side-walls of said clamp member extending over and in spaced relation to the outer face of the door, and with said bridge portion of said clamp member extending through the space existing, when the door is closed, between said edge of the door and a portion of the door-jamb which is positioned directly opposite to said edge of said door, a pressure member having a pressing portion, said pressing portion being positioned between the plane of said second side-wall of the clamp member and said outer face of the door and being movable relatively to said plane of the first side-wall for engaging part of said outer face of the door, an accessory-carrying arm member, said three members being connected in assembled relation, and means cooperating with said second side-wall of said clamp member and operative on the application of external force applied exteriorly of the vehicle to move said pressing portion of the pressure member away from said plane of the second side-wall and toward and into engagement with the outer face of the door, so as to clamp said U-shaped member to said door with a part of said clamp member embracing an edge of said door which is opposed to the door-jamb whereby said clamp member is securely mounted on the door and cannot be removed when the door is closed.

4. In an anti-theft mounting for motor-vehicle accessories, a substantially U-shaped clamp member having spaced and opposed side-walls and a connecting or bridge portion therebetween, said clamp member being adapted to embrace the edge of a door of the vehicle, a pressure member having a pressing portion, said pressing portion being positioned in opposed clamping relation to a first of said side-walls of the clamp member and being movable relatively to said first side-wall for engaging part of the outer face of the door thereby to clamp said door between said pressing portion and said first side-wall, an accessory-carrying arm member, means connecting said arm member to another of said three members, and means connecting the resulting assembly to the remaining one of said three members and adjustably limiting the space between said first side-wall and said pressing portion, both of said means cooperating to connect said three members in assembled relation and one of said means cooperating with a second of said side-walls of said clamping member and being operative on the application of external force applied exteriorly of the vehicle to move said pressing portion of the pressure member toward said first side-wall and into engagement with said outer face of the door.

JOHN W. ANDERSON.